United States Patent
Snyder et al.

(10) Patent No.: US 6,664,989 B1
(45) Date of Patent: Dec. 16, 2003

(54) METHODS AND APPARATUS FOR GRAPHICAL DISPLAY INTERACTION

(75) Inventors: Mark Snyder, Glendale, AZ (US); John Woltkamp, Fountain Hills, AZ (US)

(73) Assignee: Honeywell International Inc., Morristown, NJ (US)

( * ) Notice: Subject to any disclaimer, the term of this patent is extended or adjusted under 35 U.S.C. 154(b) by 434 days.

(21) Appl. No.: 09/691,387

(22) Filed: Oct. 18, 2000

Related U.S. Application Data

(60) Provisional application No. 60/160,119, filed on Oct. 18, 1999.

(51) Int. Cl.[7] .................................................. G09G 5/08
(52) U.S. Cl. ...................................... 345/856; 345/145
(58) Field of Search ................................ 345/856, 857, 345/860, 862, 145, 146, 157, 159, 859

(56) References Cited

U.S. PATENT DOCUMENTS

| | | | |
|---|---|---|---|
| 5,760,764 A | * | 6/1998 | Martinelli .................... 345/160 |
| 5,956,019 A | * | 9/1999 | Bang et al. .................. 345/173 |
| 5,990,862 A | * | 11/1999 | Lewis .......................... 345/858 |
| 5,990,872 A | * | 11/1999 | Jorgenson et al. ........... 345/168 |
| 6,292,624 B1 | * | 9/2001 | Saib et al. ..................... 386/83 |
| 6,295,049 B1 | * | 9/2001 | Minner ......................... 345/856 |

* cited by examiner

*Primary Examiner*—Cao (Kevin) Nguyen

(57) ABSTRACT

The present invention includes systems and methods which overcome the shortcomings of the prior art by providing improved control of cursor commands directed by a user (such as a pilot). Various embodiments of the invention include such user interface cursor control enhancements as caging, snapping, hysteresis, combinations of 'relative' and 'absolute' cursor data, integration of discrete button movement with continuous cursor movement, and different gain algorithms. The invention may be implemented in a cockpit display, a flight simulator, a graphical flight planning application, or in any other application having a graphical user interface.

17 Claims, 8 Drawing Sheets

METHODS AND APPARATUS FOR GRAPHICAL DISPLAY INTERACTION

PRIORITY INFORMATION

This application claims the benefit of U.S. Provisional Patent Application Serial No. 60/160,119 filed Oct. 18, 1999, the contents of which are hereby incorporated by reference.

BACKGROUND OF THE INVENTION

1. Technical Field

The present invention relates, generally, to aircraft cockpit displays and, more particularly, to graphical methods for displaying information in a computer user interface.

2. Background Information

Aircraft flight displays continue to advance in sophistication, achieving increasingly higher levels of information density and, consequently, presenting a greater amount of visual information to be perceived and understood by the operator. In many applications, it is important that visual displays provide a proper cognitive mapping between what the operator is trying to achieve and the information available to accomplish the task. As a result, such systems increasingly utilize human-factor design principles in order to build instrumentation and controls that work cooperatively with human operators. Accordingly, the U.S. Federal Aviation Administration (FAA) and many other governmental regulatory agencies have promulgated a number of standards and advisory circulars relating to flight instrumentation. More particularly, Title 14 of the U.S. Code of Federal Regulations, Federal Aviation Regulations (FAR) Part 25, Sec. 25.1321 et seq. provides guidelines for arrangement and visibility of instruments, warning lights, indicators, and the like. Similarly, detailed guidelines related to electronic displays can be found in FAA Advisory Circular 20–88A, *Guidelines on the Marking of Aircraft Powerplant Instruments* (September 1985).

Although cockpit user interfaces have improved dramatically in recent years, additional improvements in user friendliness and ease-of-use would be welcome. For example, in current generation aircraft, flight plan entry and editing continues to be performed using cumbersome, text-based techniques which have not changed significantly in the decade. As a result, flight crews frequently complain that current flight management systems (FMS) are non-intuitive, difficult to interpret, and require too much heads-down time. Indeed, due to the high cockpit workload involved, many flight crews abandon the FMS altogether, choosing instead to fly the aircraft using the autopilot. Improvements in FMS user interfaces would therefore be welcomed, as would improvements in many cockpit interfaces, such as those used for on-screen utility control of valves, pumps, temperature settings, option selections and the like. Even in graphical-based techniques for flight planning and control, enhancements and improvements in user interfaces would allow for increasingly intuitive pilot interaction.

Methods are therefore desired to improve the efficiency and user-friendliness of controller interaction/flight planning operations. In particular, the operation and control of pilot cursor operations may be improved.

BRIEF SUMMARY OF THE INVENTION

The present invention includes systems and methods which overcome the shortcomings of the prior art by providing improved control of cursor commands directed by a user (such as a pilot). Various embodiments of the invention include such user interface cursor control enhancements as caging, snapping, hysteresis, combinations of 'relative' and 'absolute' cursor data, integration of discrete button movement with continuous cursor movement, and different gain algorithms. The invention may be implemented in a cockpit display, a flight simulator, a graphical flight planning application, or in any other application having a graphical user interface.

BRIEF DESCRIPTION OF THE SEVERAL VIEWS OF THE DRAWINGS

The subject invention will hereinafter be described in conjunction with the appended drawing figures, wherein like numerals denote like elements, and.

DETAILED DESCRIPTION OF EXEMPLARY EMBODIMENTS

Systems and methods in accordance with various aspects of the present invention provide an improved graphical user interface for entry and editing of information in an aircraft environment, such as aircraft flight-plan data, flight control parameters, aircraft systems control or the like. In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein. Furthermore, although the invention is frequently described herein as pertaining to interfaces used in a cockpit environment, it will be appreciated that the systems and methods described herein could also be applied to graphical flight planning software, flight simulators, or any other program having a user interface.

Figure 1:
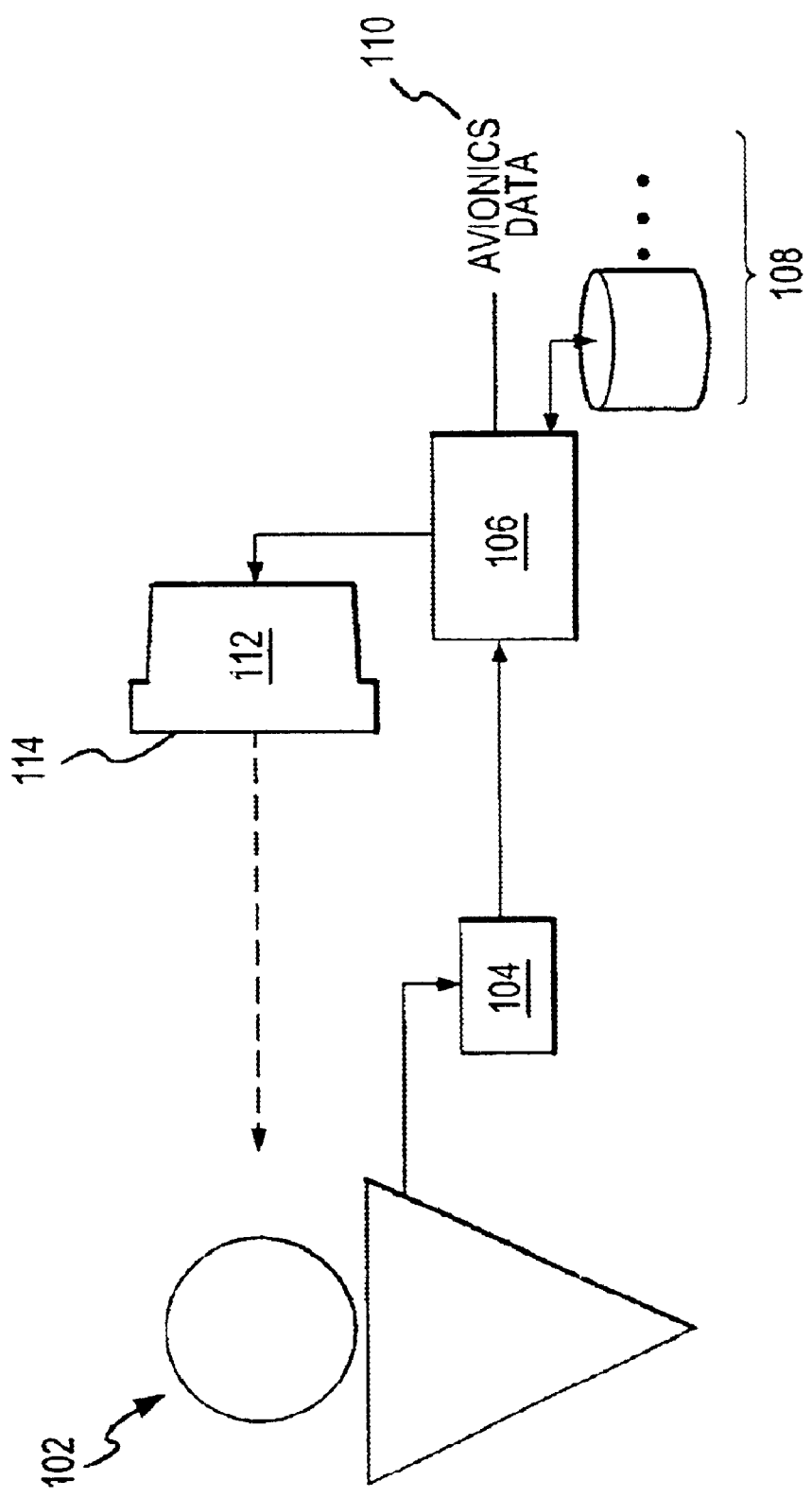
FIG. 1 is a schematic overview of a user interface in accordance with the present invention.

Briefly, referring now to FIG. 1, a system in accordance with various aspects of the present invention comprises a processor 106 configured to communicate with an associated monitor (or monitors) 112, one or more data sources 108, cursor control device 104, and avionics data 110. In general, a user 102 (e.g., a pilot), located within the aircraft (not shown) provides input to processor 106 through cursor control device 104, and receives visual feedback via a display 114 produced by monitor 112. Display 114 includes various graphical elements associated with the lateral position, vertical position, flight-plan and/or other indicia of the aircraft's operational state as determined from avionics data 110 and/or data sources 108. Through use of cursor control device 104, user 102 may modify the flight-plan and/or other such indicia graphically in accordance with feedback provided by display 114.

Cursor control device 104 includes any device suitable to accept input from user 102 and convert that input to a graphical position on display 114. Various joysticks, mice, trackballs, and the like are suitable for this purpose. In one embodiment, cursor control device 104 includes a touch-pad interface device with a thumb actuation switch on the side. In this embodiment, the user rests his or her hand on a built-in palm-rest to stabilize the hand, position the fingertip for pointing, and position the thumb for clicking. Alternate embodiments of cursor control device 104 include additional buttons in conjunction with a touchpad.

Monitor 112 may include any display monitor suitable for displaying the various symbols and information detailed below. Many currently known monitors are suitable for this task, including various CRT and flat-panel display systems.

Processor 106 encompasses one more functional blocks used to provide flight management and control, interface with cursor control device 104, and drive monitor 112. In this regard, processor 106 may include any number of individual microprocessors, memories, storage devices, interface cards, and other standard components known in the art.

Avionics data 110 includes standard information related to the state of the aircraft. Data sources 108 include various types of data required by the system, for example, flight plan data, data related to airways, navigational aids (Navaids), symbol textures, navigational data, obstructions, font textures, taxi registration, Special Use Airspace, political boundaries, COM frequencies (enroute and airports), approach info, and the like.

According to various embodiments of the invention, the pilot interacts with the map or other display 114 through the use of a cursor control device (CCD) pointer 104, mechanical button controls, and/or the multifunction keyboard. The CCD controls 104 may be designed such that the pilot can easily control interactive navigation while maintaining primary attention on the displays. Display 114 may suitably include a graphical interface with virtual buttons, pull-down menus, and/or dialogue windows to control the map appearance, FMS and the like as appropriate.

Figure 2:
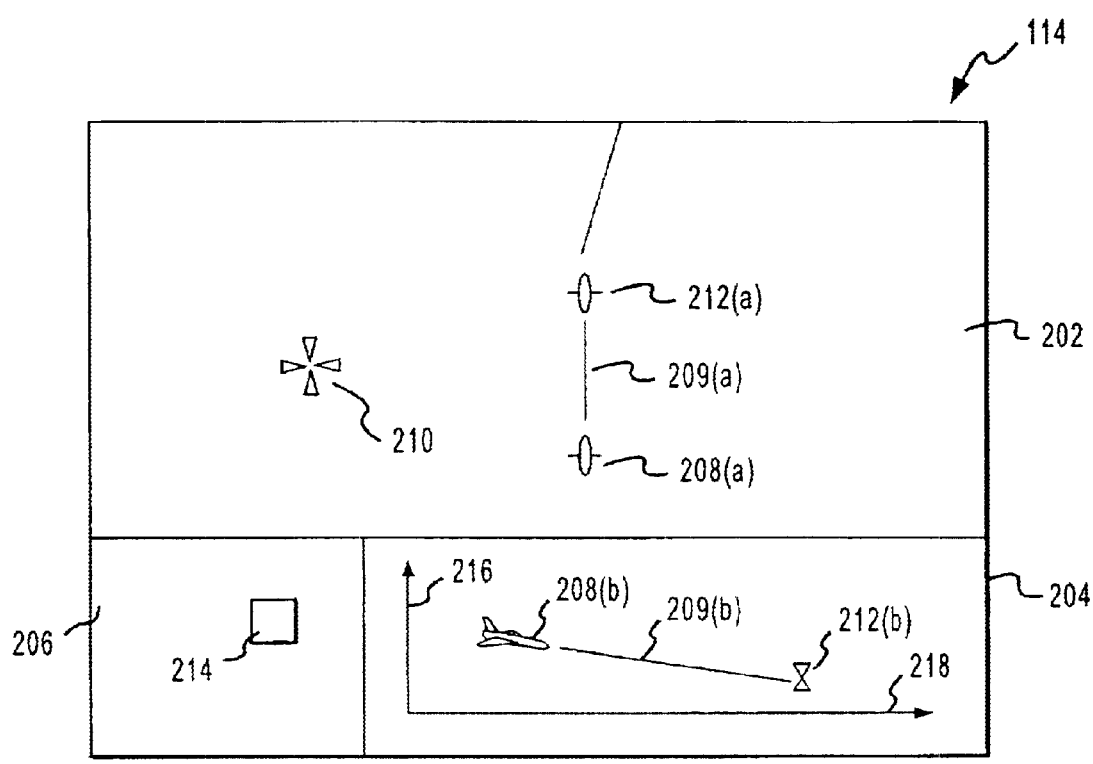
FIG. 2 is a schematic overview of an exemplary display arrangement.

Referring now to FIG. 2, an exemplary display 114 in accordance with various aspects of the present invention includes a lateral view 202, a vertical profile view (or "vertical profile") 204, and a hot-map view (or simply "hot map") 206 having an indicator 214.

Vertical profile 204 suitably includes a side-view aircraft symbol 208(b), one or more waypoint symbols 212(b) (or constraint symbols, described in detail below), line segments 209(b) connecting waypoint symbols 212(b), a first axis 218 representing lateral position and/or time, and a second axis 216 designating altitude. As with the lateral view 202 described above, the system may be configure such that the user may modify the flight plan and trajectory via graphical manipulation of symbols 212(b) using cursor symbol 210.

Lateral view 202 suitably includes various graphical elements ("symbols") representing, among other things, the lateral position of the aircraft with respect to the ground. The lateral view 202 also may include various map features, including terrain, political boundaries, and the like. In the illustrated embodiment, lateral view 202 includes a top view aircraft symbol 208(a), one or more waypoint symbols 212(a), and line segments 209(a) connecting the waypoint symbols 208(a), wherein the waypoint symbols 212(a) are associated with the current flight-path of the aircraft.

Display 114 also suitably includes a cursor symbol 210 positioned in accordance with input from user 102 received via cursor control device 104. While the details of the user's interaction with lateral view 202 will be discussed further below, in general, cursor 210 is suitably positioned by the user in order to select and graphically edit the flight plan associated with waypoints 208(a), or to perform other tasks as appropriate.

Figure 3:
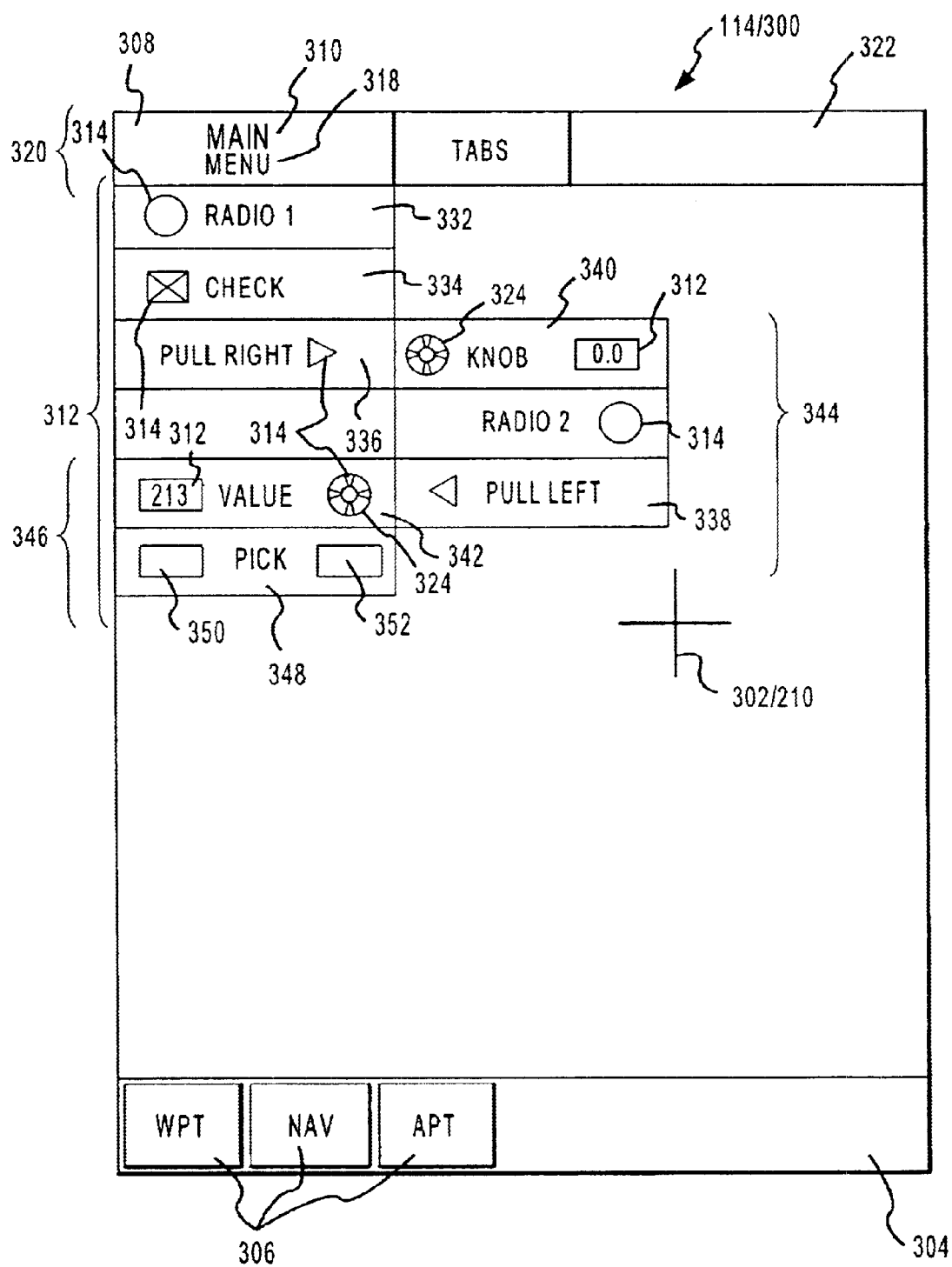
FIG. 3 is a schematic overview of a second exemplary display arrangement.

With reference now to FIG. 3, another exemplary cockpit display 114/300 suitably includes various menu bars (such as menu bar 320) or buttons 306 that may be present in a top portion 322 of the window, a bottom portion 304 of the window, or any other portion of the window. Menu bars may include one or more tabs 308, as appropriate. Each tab may include a title 310, a subtitle 318, or the like. As a user/pilot 102 selects a tab on the menu bar or a button, various sub-menu windows may be displayed in relation to the selected tab. Users may select tabs, buttons, and the like by positioning cursor 302/210 over the desired object with a pointing device (such as the CCD 104 discussed above) and clicking on a button or otherwise indicating an assent to a selection by the pointing device. Activating/selecting a tab/menu bar suitably produces a sub menu of additional options, as appropriate. The various sub-menu items available from tab 308 are shown in FIG. 3 as sub-menu 312, which includes a number of additional windows.

In various embodiments, the various windows comprising the sub-menus may include "lights" 314 or other indicators that provide enhanced functionality. Examples of lights 314 include radio buttons, checkboxes, counter windows, knobs, and the like. Window 332 in FIG. 3, for example, contains a radio button light 314 that suitably indicates whether a feature indicated by option window 332 is activated or deactivated. User 102 may suitably toggle the feature by selecting the light 314 as appropriate. Similarly, a check box such as the one shown in conjunction with window 334 may be used in place of the radio button. Windows may also contain multiple checkboxes/radio buttons as appropriate. Window 348 in FIG. 3, for example, is a "pick" window in which user 102 may select between two options by activating either box 350 or 352.

Windows 336 and 338 suitably include triangle or arrow shaped lights 314 to indicate that additional options are available in other sub-menus. As user 102 points to (or selects) window 336, for example, sub-menu 344 is displayed. Similarly, when user 102 points to (or selects) window 338, sub-menu 346 is displayed, as appropriate.

Windows 340 and 342 suitably include counter windows 312 that may be used to display information such as altitude, velocity, resolution or the like. In various embodiments the value displayed in the counter window may be adjusted with knob cursor button 324 by selecting the button and manipulating the knob (for example by indicating a clockwise or counterclockwise rotation on the pointing device) to produce a corresponding adjustment to the value being controlled. Other "lights" 314 may be used to execute additional functions in conjunction with tab 308 and sub-menu 346. It will be further appreciated that the lights shown are for exemplary purposes only, and that other types of icons, lights, or indicators could be alternatively used.

Various embodiments of the present invention include one or more techniques described below relating to improved cursor control. Each of these techniques may implemented using standard user interface techniques, such as standard graphical software programming or the like. Of course any programming language or environment could be used to implement the techniques described herein. As used herein, the term "enhanced cursor control technique" includes caging, snapping, hysteresis, combination of "absolute" and "relative" movement, and variable gain techniques. Each of these techniques is described individually below:

Caging

Figure 4:
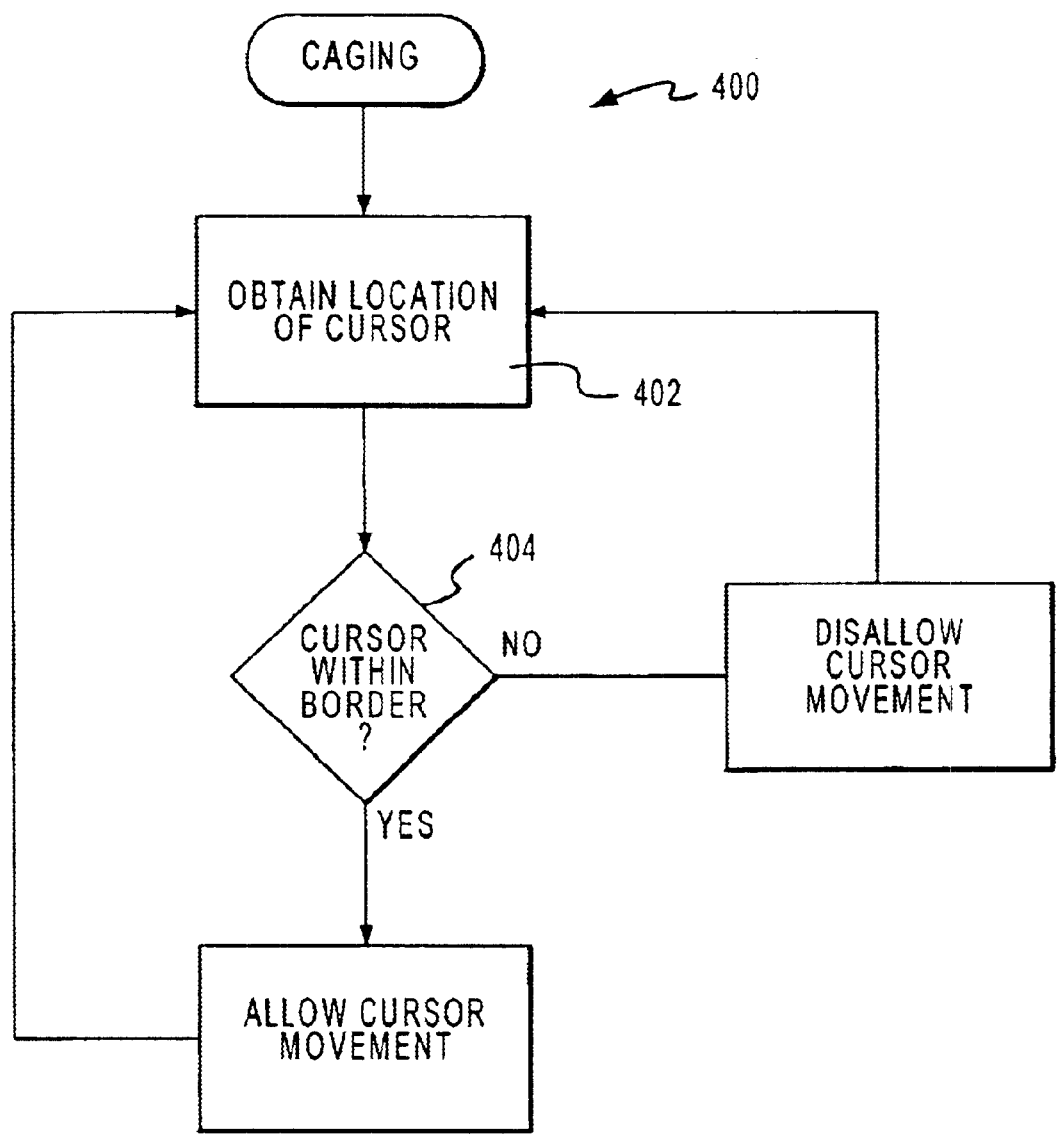
FIG. 4 is a flowchart of an exemplary caging technique.

Caging is a technique used in conjunction with windowing environments. When a pull-down menu (such as menu 320 or menu 312 in FIG. 3) is selected, the movement of cursor 210 is suitably restricted to the area of the screen representing the particular menu. If the user attempts to move cursor 210 away from the pull down menu, the cursor does not exit the space occupied by the menu. Although various techniques could be used to implement caging, an exemplary technique (shown in FIG. 4 as method 400) involves monitoring the on-screen location of the cursor (step 402), comparing the location to the location of the pull-down menu (step 404), and disallowing motions of the cursor that would place the cursor outside of the pull-down menu (step 406). The comparison executed at step 404 may be executed by comparing the relative cursor and window border locations by processor 106, by checking that the cursor location does not exceed a value corresponding to a window border, or by any other technique. Caging suitably improves pilot control of the interface by restricting cursor movement within the windowing/menuing options active at a particular time.

In various embodiments, caging is used in conjunction with menus and submenus such as those shown in FIG. 3. In such embodiments, cursor 210 is "caged" to a menu 312 or sub-menu 344/346. As a menu 312 or submenu 344/346 is opened (e.g. by positioning the cursor over a particular tab 308), cursor movement is suitably restricted to the menu or submenu appearing on display 114 (FIG. 1). If cursor 210 is positioned over a button (e.g. buttons 336 and 338 in FIG. 3) that controls a pull out menu (e.g. left or right pull out menus 344 and 346 in FIG. 3), cursor 210 may be allowed to move out of the cage in the direction that the menu pulls out (indicated by an arrow or other "light"). When cursor 210 moves out of the sub-menu button (e.g. button 336 in FIG. 3) in the direction indicated, the submenu (e.g. submenu 344) opens and cursor 210 may be suitably caged in the sub- menu. If cursor 210 moves back over the first menu, the submenu may be closed as appropriate.

Snapping

Figure 5:
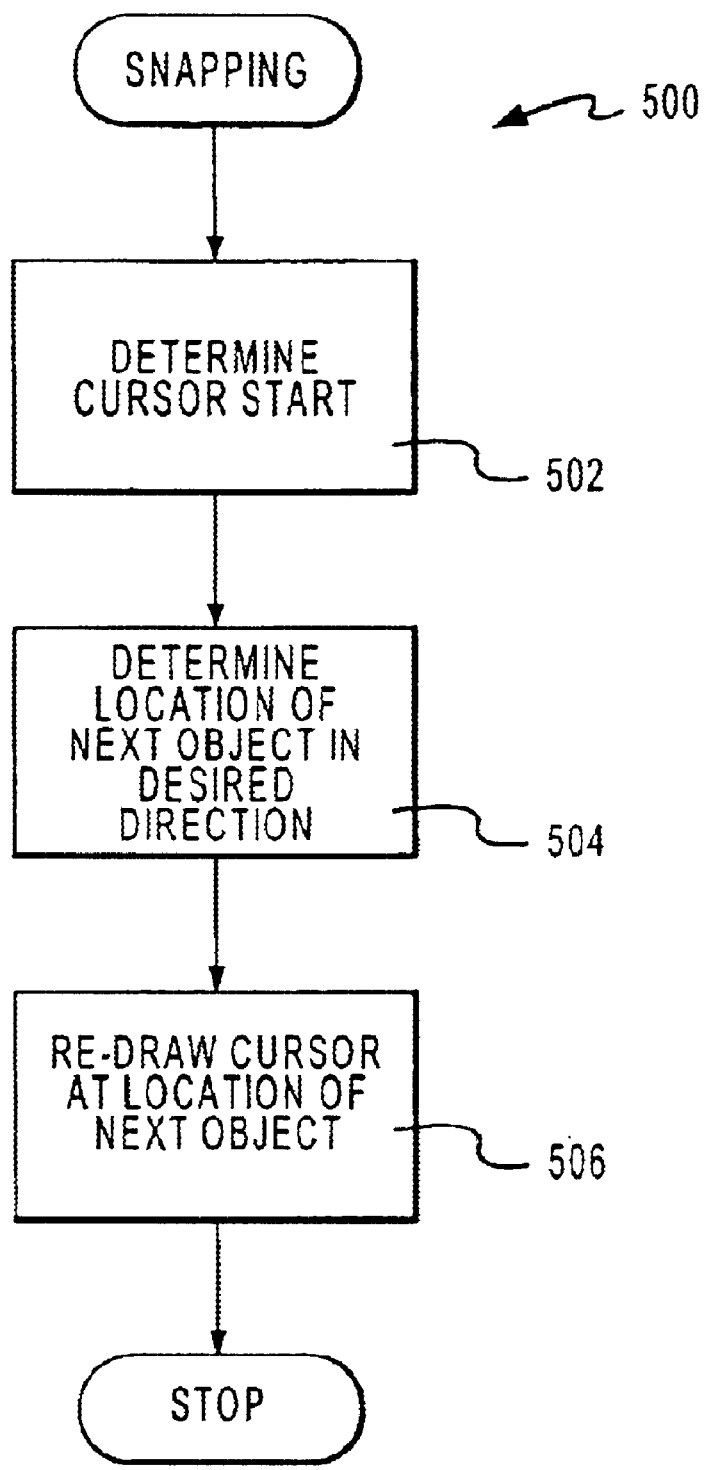
FIG. 5 is a flowchart of an exemplary snapping technique.

Snapping is a technique used to maintain cursor over a button. When snapping is enabled, the display computer places the cursor on a button. As the user attempts to move the cursor away from its initial position, the display computer moves the cursor directly to the next button in the direction of the cursor's movement. Of course movement directions may be approximated, and snapping is not limited to movement between buttons, but may be allowed between icons, objects, map locations, waypoints, or the like. Further, snapping could be used to move between menu bars, sub-menus, buttons, radio boxes, dialog boxes or any other user interface elements or combination of elements. Snapping may be accomplished by any method, such as the method 500 shown in FIG. 5. According to the flowchart shown in FIG. 5, snapping is suitably accomplished by determining a starting location (i.e. a location of cursor 210) (step 502), determining a location of the next object (e.g. button, box, etc.) in the direction of cursor movement (step 504), and repositioning cursor 210 at the desired location. The various steps may be executed at, for example, processor 106 using conventional programming techniques.

An additional benefit of snapping is that it may be used to assert fine control over what symbology the cursor symbol may occlude. By only allowing cursor movement over certain allowed button targets, the cursor can be restricted from floating over critical data or other regions of display 114 that are desired to be protected.

Hysteresis

Hysteresis is a technique that may be used alone or in combination with snapping. Hysteresis involves slowing the rate at which cursor 210 moves across the various buttons so that the user gets the impression that the buttons are "sticky" (i.e. that the cursor is sticking to the buttons). Hysteresis may be implemented by slowing or otherwise skewing the conventional distance algorithm used to relate cursor control device 104 inputs to cursor movement on the screen when cursor 210 is positioned over a button or other object of interest. In this manner, additional CCD input may be required to move the cursor away from the object of interest.

Figure 6:
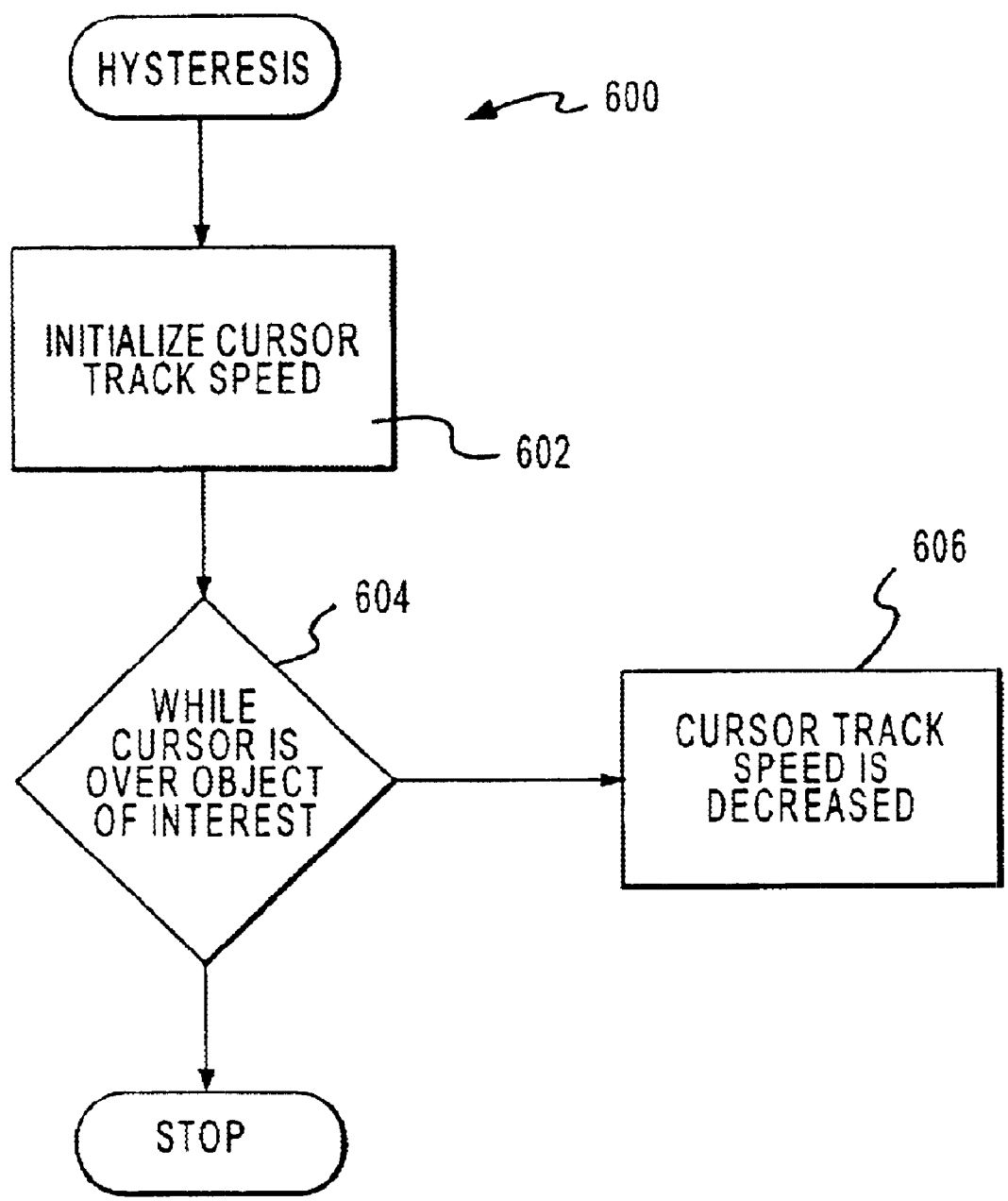
FIG. 6 is a flowchart of an exemplary hysteresis technique.

An exemplary technique 600 for implementing hysteresis is shown in FIG. 6. With reference now to FIG. 6, hysteresis suitably includes initializing cursor track speed (i.e. the speed at which cursor 210 tracks input at CCD 104) at step 602 and decreasing the track speed (step 606) WHILE cursor 210 is positioned over an object of interest (step 604). Many variations on this technique are possible, including the use of "IF-THEN" or other comparison constructs in place of a WHILE construct. Alternatively, the "logical size" of a button, window or other relevant object may be increased in memory such that the time to move cursor 210 across the object is delayed. Similarly, the "logical size" of areas outside of relevant buttons, windows, and the like may be decreased in memory such that the time to move cursor 210 across such regions is decreased.

Combination of 'Relative' and 'Absolute' Cursor Data

In various embodiments of the invention, the CCD 104 is a touchpad or similar device. In such embodiments, a user directs the movement of cursor 210 by tracing the desired cursor movement on the touchpad with the users' finger. If the user lifts his or her finger, cursor 210 typically remains motionless until the user replaces his/her finger to the touchpad. If the user places his or her finger at a different location on the touchpad from the last location actually touched, the cursor typically does not move. Rather, movement cursor 210 typically continues as if the user had never raised his or her finger. This sort of movement is typically considered "relative" movement, since the movement of the cursor is relative to the movement of the users' finger on the touchpad, and not to the actual position of the user's finger on the touchpad.

Figure 7:
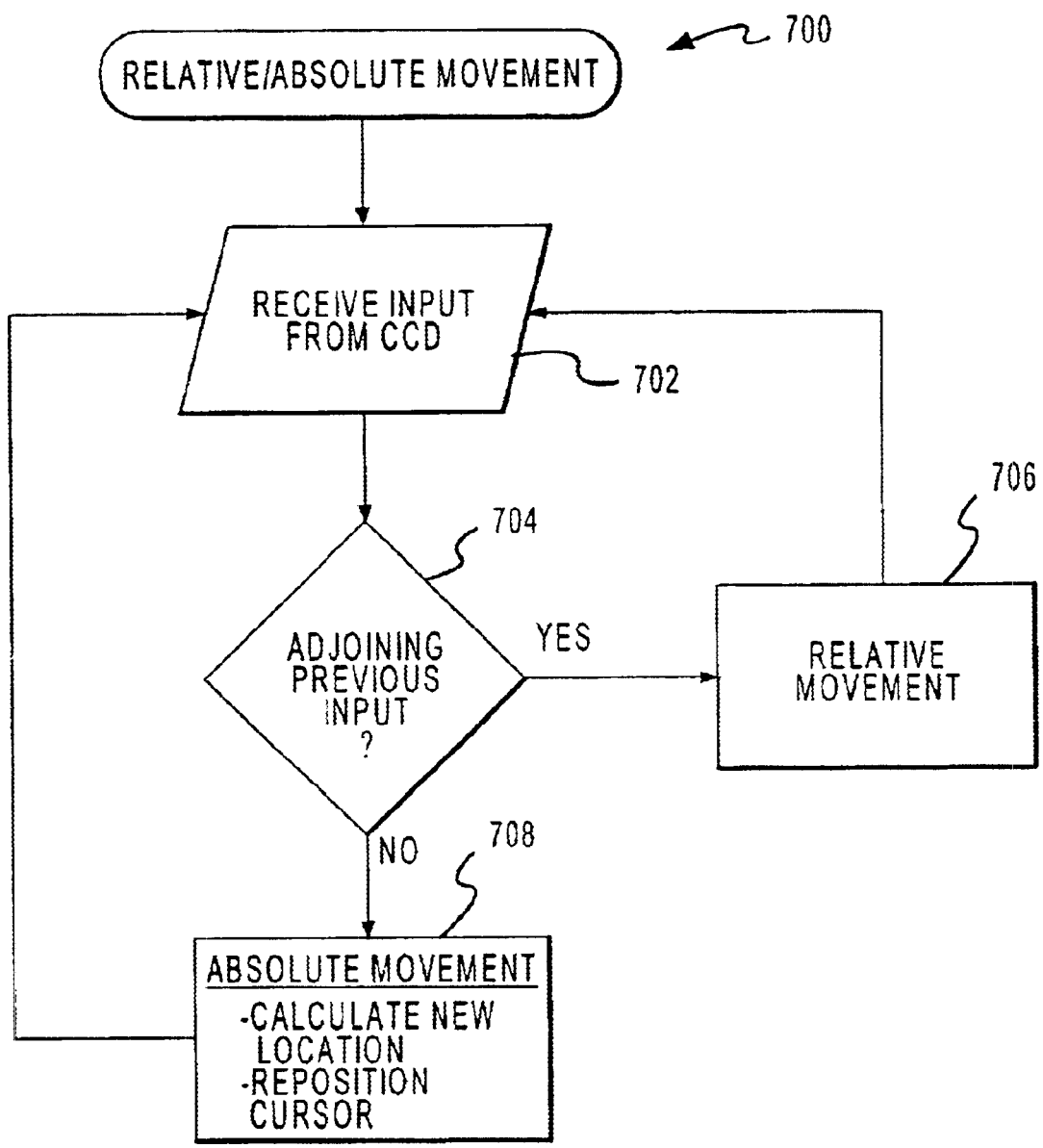
FIG. 7 is a flowchart of an exemplary technique for combining relative and absolute movement.

In various embodiments of the invention, absolute motion may also be tracked. In such embodiments, the various points on the touchpad may be mapped to particular points on the display screen such that when the user raises his or her finger and replaces the finger at another location on the touchpad, the cursor will relocate to the screen position corresponding to the touchpad location currently in contact with the user's finger. Alternatively, the relative distance between the point the finger is raised and the point where the finger is lowered may be tracked on screen. In various embodiments, the absolute movement is mapped to a target on the display screen such that absolute movement takes place when the user lifts his or her finger from the screen, but relative movement continues for such time as the user retains his or her finger on the touchpad. With reference now to FIG. 7, an exemplary process 700 for combining relative and absolute movement suitably involves receiving inputs (step 702) from CCD 104 and monitoring the inputs (step 704) to determine if subsequent inputs are adjoining (indicating continuous movement) or disjoint (indicating a movement of the users'finger from one place to another on CCD 104). If the inputs are adjoining, relative movement is processed via conventional techniques (step 706). If the inputs are disjoint, non-continuous movement may be assumed and absolute movement may be handled as appropriate (step 708). In an exemplary process for handling absolute movement, the desired cursor location is computed based upon the input received from CCD 104, and cursor 210 is repositioned at that location.

In an exemplary embodiment, absolute movement may be suitably allowed when the user's touch is within a certain region of CCD 104. For example, absolute jumps may be enabled only if the user touches CCD 104 at the very top (or very bottom) of the touchpad. In this way, selective absolute movements (e.g. movements sensitive to user 102 touching the corner of CCD 104, for example) may be implemented. Alternatively, absolute movement may be implemented by logically dividing the area of CCD 104 into enlarged regions that mimic the display 114 in which cursor 210 is shown. For instance, display 114 includes three selectable buttons on top and three selectable buttons on the bottom, the touchpad (or other CCD 104) may be broken into six regions, as appropriate. As user 102 touches any of the six regions of CCD 104, the displayed cursor 21 is appropriately positioned as if it were centered on one of the six buttons (even though the actual cursor coordinates may not be on that particular button at that time). Of course many other techniques for implementing absolute movement may be formulated, all of which are within the ambit of the present invention.

Variable Gain (i.e. Variable Sensitivity)

In various embodiments of the invention, the gain of cursor 210 is adjusted such that cursor 210 appears to slow down on display 114 faster than it speeds up. This may be accomplished by assigning unequal acceleration and deceleration rates to cursor 210 as it tracks inputs from CCD 104. Alternatively, delay sequences may be imposed during "speed up" periods to slow the rate of acceleration. By slowing the acceleration rate and increasing the deceleration rate, control is improved and the user is better enabled to point at targets on the display screen.

Figure 8:
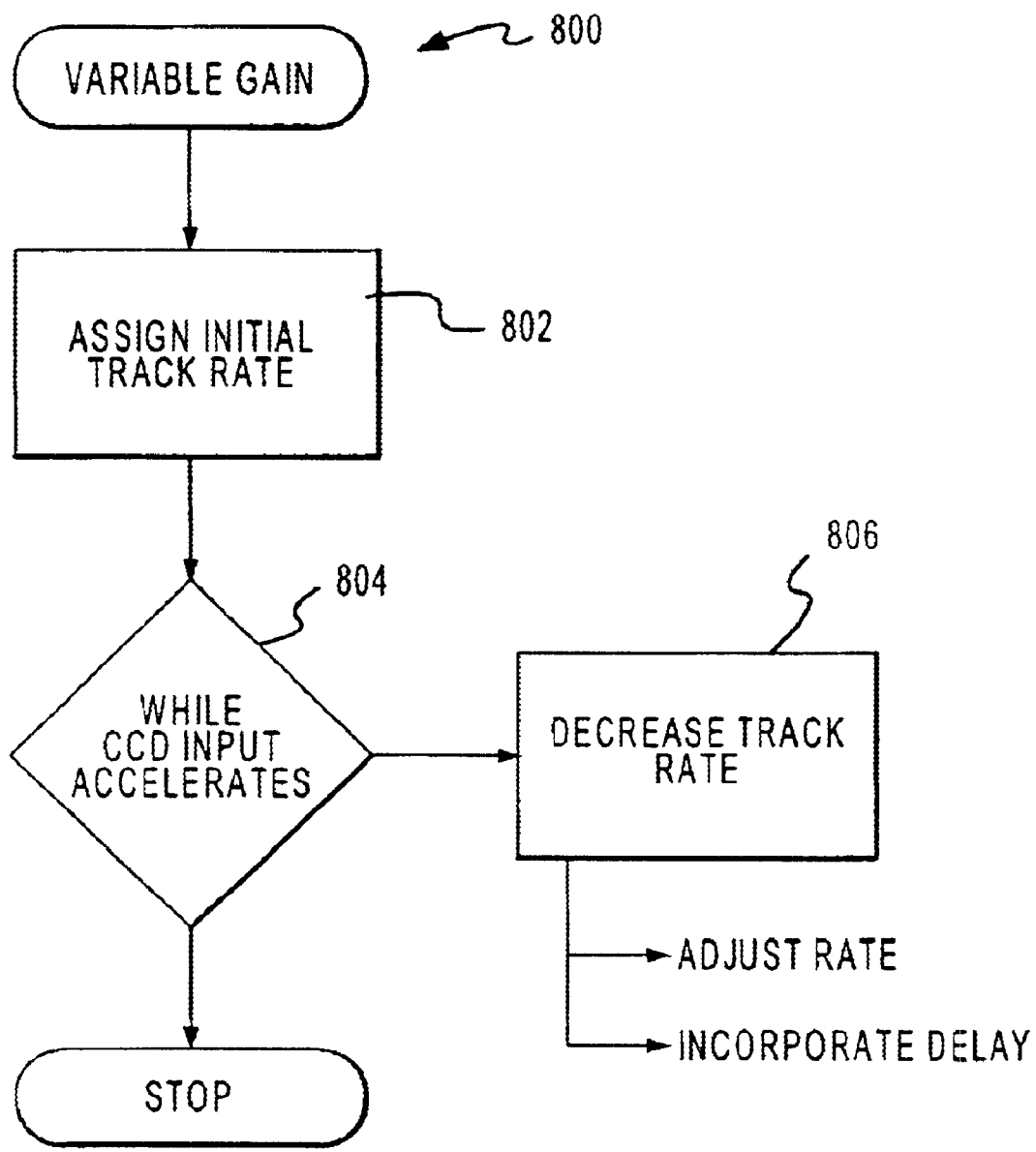
FIG. 8 is a flowchart of an exemplary variable gain technique.

An exemplary process 800 for implementing a variable gain display 114 is shown in FIG. 8. With reference now to FIG. 8, a variable gain technique 800 suitably includes assigning an initial value to the rate at which cursor 210 tracks inputs on CCD 104 (step 802) and decreasing the track rate (step 806) WHILE the input from CCD 104 is accelerating. Again, the track rate may be decreased by adjusting a variable corresponding to the track rate, or by incorporating an artificial delay (e.g. a FOR-NEXT loop) to delay processing of accelerating inputs. Although not shown in FIG. 8, a similar method could be used to increase the track rate while the CCD input decelerates, as appropriate and desired.

Integration of Discrete Button Movement with Continuous Cursor Movement

In the various embodiments that include mechanical button controls on CCD 104, discrete events may be applied to the button layout. For example, four buttons on CCD 104 may be programmed to correspond to left, right, up and down movements via conventional techniques. The movements triggered by the button controls may activate, deactivate, or otherwise incorporate the enhanced cursor control techniques described above (snapping, hysteresis, caging, and the like) such that cursor movements made with the buttons exhibit the enhanced control technique, but that cursor movements made with the motion-sensitive portion of CCD 104 do not. Conversely, CCD 104 may be configured such that the enhanced cursor control techniques are exhibited during cursor control movements with the motion-sensitive potion of CCD 104 but not with the buttons. Various embodiments may combine discrete button movements with continuous cursor movements (or vice versa) such that button controls "snap" (or "cage", or the like) to particular objects on screen while CCD 104 provides more freedom of movement for the user. Of course discrete button control may also be combined with relative and absolute movement of the CCD for added control by the user.

Although the invention has been described herein in conjunction with the appended drawings, those skilled in the art will appreciate that the scope of the invention is not so limited. It should be understood that the exemplary processes illustrated may include more or fewer steps or may be performed in the context of a larger processing scheme, for example. In particular, the flowcharts that accompany the written description contained herein are intended to illustrate exemplary processes only. Modifications in the selection, design, and arrangement of the various components and steps discussed herein may be made without departing from the scope of the invention as set forth in the appended claims.

What is claimed is:

1. A system for providing feedback on a graphical display to a user, the system comprising:
    a control device responsive to user inputs;
    a processor configured to receive said user inputs from said control device and to generate an output in response to said user inputs, said output being based at least in part upon a distance algorithm; and
    a display configured to produce said feedback and said graphical display comprising a cursor and at least one button in response to said output from said processor;
    wherein said processor is further configured to process said output with an enhanced cursor control technique such that said cursor is positioned on said display in response to said user inputs, and wherein said enhanced cursor control technique comprises skewing said distance algorithm when said cursor is positioned in proximity to said at least one button to slow the rate at which the cursor passes over the button to thereby form a hysteresis effect.

2. The system of claim 1 wherein said enhanced cursor control technique comprises caging.

3. The system of claim 2 wherein said graphical display feedback comprises a selectably-activated menu and wherein movement of said cursor is restricted to said menu when said menu is activated.

4. The system of claim 1 wherein said enhanced cursor control technique comprises snapping.

5. The system of claim 1 wherein said enhanced cursor control technique comprises absolute cursor movement.

6. The system of claim 5 wherein said enhanced cursor control technique comprises absolute cursor movement in combination with relative cursor movement.

7. The system of claim 1 wherein said enhanced cursor control technique comprises variable sensitivity of said cursor to said user inputs.

8. The system of claim 1 wherein said control device comprises a touchpad and a plurality of buttons, and wherein said output is produced such that said enhanced cursor control technique is applied to said user inputs emanating from said buttons but not to said user inputs emanating from said touchpad.

9. A method of displaying feedback information to a user, the method comprising the steps of:
   obtaining a user input indicative of a desired cursor movement from a controller device;
   processing said user input to generate a display image comprising a cursor and at least one button, wherein the position of the cursor is based at least in part upon a distance algorithm;
   skewing said distance algorithm when said cursor is positioned in proximity to said at least one button to slow the rate at which the cursor passes over the at least one button to thereby form an enhanced cursor control technique; and
   displaying said display image comprising said cursor to said user to provide said feedback information;
   wherein said display image is processed with at least one enhanced cursor control technique such that said cursor exhibits said desired cursor movement.

10. The method of claim 9 wherein said enhanced cursor control technique comprises caging.

11. The system of claim 10 wherein said display image comprises a selectably-activated menu and wherein movement of said cursor is restricted to said menu when said menu is activated.

12. The method of claim 9 wherein said enhanced cursor control technique comprises snapping.

13. The method of claim 9 wherein said enhanced cursor control technique comprises absolute cursor movement.

14. The method of claim 13 wherein said enhanced cursor control technique comprises absolute cursor movement in combination with relative cursor movement.

15. The method of claim 9 wherein said enhanced cursor control technique comprises variable sensitivity of said cursor to said user inputs.

16. The system of claim 9 wherein said controller device comprises a touchpad and a plurality of buttons, and wherein said display image is produced such that said enhanced cursor control technique is applied to said user inputs emanating from said buttons but not to said user inputs emanating from said touchpad.

17. A method of implementing hysteresis in a graphical display having a cursor and at least one object of interest, the method comprising the steps of:
   initializing a track speed of the cursor to an initial value;
   decreasing the track speed of the cursor while the cursor is located in proximity to the object of interest to thereby slow the speed at which the cursor passes over the object of interest; and
   restoring the initial value of the track speed of the cursor when the cursor is no longer located in proximity to the object of interest.

* * * * *